3,526,475
DIETHYLAMINOETHYLATED CELLULOSE-EPOXIDE REACTION PROCESS

Donald M. Soignet, Metairie, and Ruth R. Benerito and John B. McKelvey, New Orleans, La., assignors to the United States of America as represented by the Secretary of Agriculture
No Drawing. Filed Jan. 11, 1968, Ser. No. 696,999
Int. Cl. D06m *13/10;* C08g *23/10, 23/12*
U.S. Cl. 8—120            6 Claims

ABSTRACT OF THE DISCLOSURE

The reaction of diethylaminoethylated cotton and various mono- and difunctional epoxides to produce a fabric with improved resiliency and/or resistance to wear.

---

A non-exclusive, irrevocable, royalty-free license in the invention herein described, throughout the world for all purposes of the United States Government, with the power to grant sublicenses for such purposes, is hereby granted to the Government of the United States of America.

An object of the present invention is to provide a method for preparing at will some cellulose ethers. A further object of this invention is to provide a method for preparing cellulose ethers with wet and conditioned crease recovery and/or resistance to abrasion.

It is well known that diethylaminoethylated cotton can be prepared by the method of Hartman, (Hartman, M., U.S. Pat. 1,777,790, Oct. 7, 1930). This cotton possesses crease recovery values of about 220 wet and about 180 conditioned. It is also known in the prior art that epoxides can add to unmodified cellulose in the presence of an acid catalyst [McKelvey, J. B. Webre, B. G. Benerito, R. R., Am. Dye Reporter, 49, 804 (1960)] while others will add to unmodified cellulose in the presence of basic catalysts [McKelvey, J. B., Benerito, R. R., Berni, R. J., and Burgis, B. G., Journal of Applied Polymer Science, 7, 1371 (1963)].

By the process of this invention, epoxides can be reacted with tertiary amine hydrohydroxide by removing the H+ and the OH− from the amine complex to form the free amine. This amine can then serve as a catalyst in the addition of the epoxide to available hydroxyls. The following equation illustrates the probable course of this reaction:

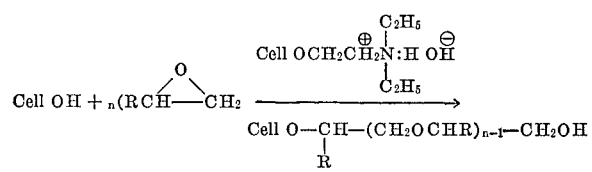

The R group may be further reactive toward cellulose as for example a halide, an alkene or an epoxide, in which case crosslinking of cellulose chains could occur either through the amine group or the cellulose hydroxyls.

In the present invention, a cotton fabric is pretreated with a 10% aqueous solution of β-chloroethyldiethylamine hydrochloride. The treated fabric is then dried and immersed overnight in a 25% aqueous solution of NaOH. The fabric is washed in dilute acetic acid to remove NaOH, dried and air equilibrated.

The DEAE cottons so prepared are immersed in neat or alcoholic solutions of epoxides at elevated temperatures for a specified period of time. They are washed in MeOH, tap $H_2O$ and distilled $H_2O$ and ironed dry and allowed to air equilibrate.

EXAMPLE 1

Approximately 10 g. of an 80 x 80 printcloth, desized, scoured, and bleached was impregnated in a 10% solution of β-chloroethyldiethylamine hydrochloride for ten minutes. The fabric was dried in an air oven at 60° C. The fabric was then immersed in a 25% aqueous solution of NaOH for a period of 16 hours. The treated fabric, diethylaminoethylated cellulose, was washed in dilute acetic acid, tap water, ironed dry and equilibrated. The nitrogen content of the treated fabric determined and the above sequence of operations was repeated until a nitrogen content of at least 0.7% was obtained.

EXAMPLE 2

Approximately 10 g. of diethylaminoethylated cotton prepared as in Example 1 and having a nitrogen content of 1.22% and wet and conditioned crease recovery angles of 220 and 228 (W+F) degrees, breaking strength of 74 pounds and Stoll flex abrasion value of 500 cycles, was placed in a 100 ml. graduate cylinder containing excess reagent grade butadiene diepoxide, preheated to and maintained at 95° C. for two hours. After the reaction period, the fabric was washed in absolute methanol followed by washing in tap water and then distilled water. The fabric was ironed dry and equilibrated and had a weight gain of 4.6% and a wet and conditioned crease angle of 219 and 263 (W+F) degrees, respectively, breaking strength of 28 pounds and flex abrasion value of 258 cycles.

EXAMPLE 3

Approximately 10 g. of diethylaminoethylated cotton prepared as in Example 1 and having a nitrogen content of 1.02% and a wet and conditioned crease recovery angle of 208 and 188 (W+F) degrees, breaking strength of 72 pounds and Stoll flex abrasion value of 540 cycles, was placed in a 100 ml. graduate cylinder containing excess reagent grade allyglycidyl ether, preheated to and maintained at 95° C. for 5 hours. After the reaction period, the fabric was washed in absolute methanol followed by washing in tap water and then distilled water. The fabric was ironed dry and equilibrated and had a weight gain of 15.3% and a wet and conditioned crease angle of 286 and 181 (W+F) degrees, breaking strength of 52 pounds and flex abrasion value of 800 cycles.

EXAMPLE 4

Approximately 10 g. of diethylaminoethylated cotton prepared as in Example 1 and having a nitrogen content of 1.02% and a wet and conditioned crease recovery angle of 208 and 188 (W+F) degrees, breaking strength of 72 pounds and Stoll flex abrasion value of 540 cycles, was placed in a 100 ml. graduate cylinder containing excess reagent grade styrene oxide, preheated to and maintained at 95° C. for 5 hours. After the reaction period, the fabric was washed in absolute methanol followed by washing in tap water and then distilled water. The fabric was ironed dry and equilibrated and had a weight gain of 30.7% and a wet and conditioned crease angle of 228 and 174 (W+F) degrees, breaking strength of 71 pounds and flex abrasion value of greater than 10,000 cycles.

EXAMPLE 5

Approximately 10 g. of diethylaminoethylated cotton prepared as in Example 1 and having a nitrogen content of 1.02% and a wet and conditioned crease recovery angle of 208 and 188 (W+F) degrees, breaking strength of 72 pounds and Stoll flex abrasion value of 540 cycles, was placed in a 100 ml. graduate cylinder containing excess reagent grade phenylglycidyl ether, preheated to and maintained at 95° C. for ½ hour. After the reaction period, the fabric was washed in absolute methanol followed by washing in tap water and then distilled water. The fabric was ironed dry and equilibrated and had a weight gain of 51.4% and a wet and conditioned crease angle of 207 and 181 (W+F) degrees, breaking strength of 44 pounds and flex abrasion value of >10,000 cycles.

EXAMPLE 6

Approximately 10 g. of diethylaminoethylated cotton prepared as in Example 1 and having a nitrogen content of 1.02% and a wet and conditioned crease recovery angle of 208 and 188 (W+F) degrees, breaking strength of 72 pounds and Stoll flex abrasion value of 540 cycles, was placed in a 100 ml. graduate cylinder containing excess reagent grade glycidyldiethylamine, preheated to and maintained at 95° C. for 7 hours. After the reaction period, the fabric was washed in absolute methanol followed by washing in tap water and then distilled water. The fabric was ironed dry and equilibrated and had a weight gain of 1.8% and a wet and conditioned crease angle of 257 and 180 (W+F) degrees, breaking strength of 66 pounds and flex abrasion value of 600 cycles.

We claim:
1. A process for producing cellulose ethers in fabric form which process comprises the following steps:
  (a) reacting diethylaminoethylated cotton with a nitrogen content of about 1% with a reagent, selected from a group consisting of butadiene diepoxide, styrene oxide, allylglycidyl ether, phenylglycidyl ether, and glycidyldiethylamine, preheated to and maintained at a temperature of about 95° C. for a period of about from 0.5 hours to about 7 hours,
  (b) washing the fabric of reagents, drying, and equilibrating the washed fabric.
2. A process according to claim 1 wherein the reagent is butadiene diepoxide.
3. A process according to claim 1 wherein the reagent is allylglycidyl ether.
4. A process according to claim 1 wherein the reagent is styrene oxide.
5. A process according to claim 1 wherein the reagent is phenylglycidyl ether.
6. A process according to claim 1 wherein the reagent is glycidyldiethylamine.

References Cited

UNITED STATES PATENTS 2,898,310  8/1959  Greer _____ 260—2.1
3,277,025  10/1966  Flodin et al. _____ 260—2.1

OTHER REFERENCES

Hoffpauir et al.: Textile Research Journal, vol. 20, pp. 617–620 (1950).

Benerita et al.: Analytical Chemistry, vol. 37, pp. 1693–1699 (1965).

GEORGE F. LESMES, Primary Examiner

J. CANNON, Assistant Examiner

U.S. Cl. X.R.

8—116; 260—2.1, 231, 232